July 12, 1966      B. LEVENETZ      3,260,398

WOVEN REINFORCEMENT FOR COMPOSITE STRUCTURE

Filed Jan. 29, 1962

INVENTOR.
BORIS LEVENETZ

BY *Jno. J. Posta Jr.*

AGENT

United States Patent Office 3,260,398
Patented July 12, 1966

3,260,398
WOVEN REINFORCEMENT FOR COMPOSITE STRUCTURE
Boris Levenetz, San Diego, Calif., assignor to Whittaker Corporation, a corporation of California
Filed Jan. 29, 1962, Ser. No. 169,558
2 Claims. (Cl. 220—3)

This invention relates to a reinforcement structure, and more particularly to a woven reinforcement structure for use as a reinforcement frame around discontinuities in a fibrous structure.

An object of this invention is to provide a reinforcement for woven structures.

Another object of the invention is to provide a woven reinforcement for use in strengthening the area about an opening in a woven structure.

A further object of this invention is to provide a woven reinforcement means for an opening in a woven structure which means includes a circumferentially wound filament having a radial fill.

Still another object of the invention is to provide a reinforcing structure for openings in woven pressure chambers, which structure is capable of bearing the tangential forces developed by the pressure tending to enlarge the openings.

Yet another object of the invention is to provide a reinforcement structure for openings in pressure chambers which is capable of supporting tangential force developed in the chamber, in an efficient manner, wherein the reinforcement is lightweight and has high load-bearing capacity.

Many applications of woven structures today require that the structure be lightweight in character. For example, any structure which has use on an airplane, missile, or satellite should be made of lightweight material, since any decrease in the weight of the apparatus forming part of the aircraft results in an increase in its payload. Accordingly, various pressure vessels, such as rocket motor casings, have been made out of fibrous material which has a high strength to weight characteristic. These fibrous structures are woven in the usual bi-directional fashion. A problem has been created, however, in reinforcing the openings in the pressure vessels. Heretofore, the reinforecements used around the openings in the woven pressure vessels have been cut from fabric having the usual bi-directionally wound fibers. These reinforcements proved to be inefficient. The fibers of the reinforcement patch were not aligned with the forces created about the opening and consequently, a plurality of these reinforcements had to be used to obtain the necessary strength characteristic required.

The present invention contemplates the use of a reinforcement structure which has fibers oriented in such a manner as to be aligned with the forces developed about the openings in the woven structure of the pressure vessel. Instead of using a reinforcement woven in the usual bi-directional fashion, a novel reinforcement is provided which has circumferentially wound filaments and a radial fill. The filaments forming the radial fill are aligned with the forces developed and thereby more efficiently supports the developed loads. The result is a net savings in weight and profound increase in the strength to weight characteristic of the composite pressure vessel.

Other objects and advantages of the present invention will appear in the following description and will be particularly pointed out in the appended claims, reference being had to the accompanying drawings forming part of this specification, and in which:

Figure 1:
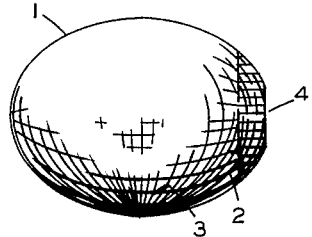
FIGURE 1 is a front elevational view of the rocket motor casing, showing an opening therein, and a conventional reinforcement thereon.

Referring to the drawing, FIGURE 1 shows a typical woven rocket motor casing 1. The structure comprises a plurality of filaments 2 and 3 bound together by an adhesive. The fibers are close to one another and are usually several layers thick so as to form a rigid composite structure. An opening 4 is provided in the structure and serves as an output nozzle for the pressure vessel.

Figure 2:
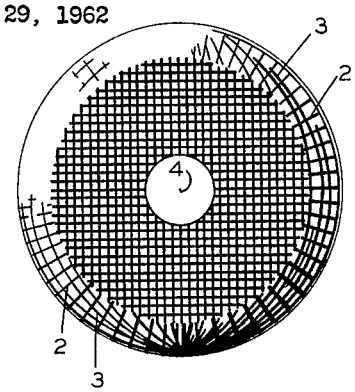
FIGURE 2 is an enlarged end view of the rocket motor casing of FIGURE 1 with the conventional reinforcement about the opening therein.

As can be more clearly seen in FIGURE 2, certain fibers 2 and 3 passing through the area of the opening 4 are discontinuous due to the presence of the opening 4. Because of these discontinuities, the area about the opening 4 is weaker relative to the other areas of the pressure vessel which have continuous fibers.

Figure 3:
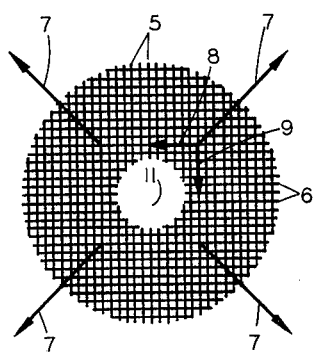
FIGURE 3 is a detail view of the reinforcement structures heretofore used to strengthen the area about the openings in woven rocket motor casings along with a showing of the forces developed therein.

Heretofore, patches such as is shown in FIGURE 3, have been placed on the pressure vessels about the opening 4 to add strength to this rim area. The reinforcements used were cut out of a fabric woven in the usual bi-directional fashion, having vertically extending fibers 5 and horizontally extending fibers 6. When these reinforcements were placed about an opening 4 in a pressure vessel, and attached thereto by an adhesive, certain forces were developed therein due to the pressures created in the vessel. These forces, shown in FIGURES 3 as 7, are developed in a radial fashion. The fibers 5 and 6 support this force as at 8 and 9. Since the fibers 5 and 6 are not aligned with the forces developed, an inefficient load bearing capacity exists.

The instant invention solves this problem by providing a reinforcement consisting of a plurality of fibrous rings 10 concentrically arranged about an opening 11. The fibrous fill 12 is disposed in radial fashion from the opening 11. After being woven in this fashion, the respective fibers are attached to each other by dipping the reinforcement in an adhesive bath and allowing the adhesive to cure. After the cure, the adhesive serves to keep the respective fibers in place. This reinforcement is then placed about the opening 4 in a pressure vessel and attached thereto by an adhesive, in the fashion noted above with respect to prior art reinforcements.

It can be readily seen that the forces 7' developed in the pressure vessel about the opening are now supported by fibers 12 which are aligned with the forces 7' and readily support the developed forces 7'. Further, the developed forces 7' tend to enlarge or deform the opening 11 in the pressure vessel. This enlargement is prevented by the presence of the concentric fibers 10. The fibers 10 are closed rings and a rupture of the rings 10 must be had before enlargement of the opening 11 is possible. This is not true with the heretofore used reinforcement shown in FIGURE 3 which had no continuous load bearing fiber therein.

Figure 4:
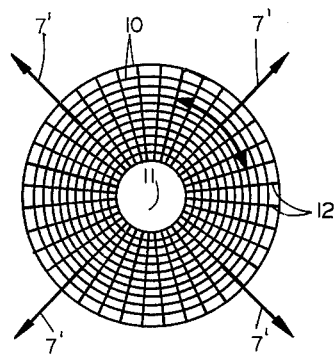
FIGURE 4 is a detail view showing the constructure of the novel reinforcement of the invention and the forces developed therein.
Figure 5:
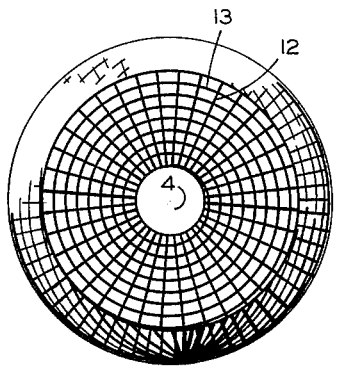
FIGURE 5 is a modification of the reinforcement structure of FIGURE 4 in use on a rocket motor casing.

FIGURE 5 shows a modification of the invention. In this embodiment, the reinforcement is made of a spirally wound fiber 13 having a radial fill 12. The discussion relative to FIGURE 4 applies here. The spirally wound fiber 13 permits ease of fabrication.

Figure 6:
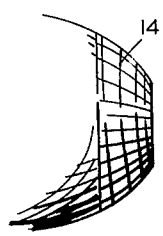
FIGURE 6 is another modification of the reinforcement structure of FIGURE 4.

FIGURE 6 shows another embodiment of the invention. The reinforcement 14 here is made having a concave form. This form of the reinforcement is made to conform with the outside surface of a pressure vessel and optimizes the load bearing capacity of the reinforcement. The concentric fiber can be wound in spirial fashion or can consist of a plurality of rings of fiber. The reinforcement shown in FIGURE 4 or FIGURE 5 can be made in concave form.

The fibers used to make the reinforcement are preferably made of glass or nylon, but other fibers such as cotton, wool, and metal can be used. The reinforcement can be used about openings in pressure vessels, as described above, but also can be used to reinforce any structure having an opening therein, wherein a high load bearing capacity is desired. They can be used, for example, about the eyelet openings in sails or other structures developing radial forces.

While the invention has been described in more or less detail, it is not limited thereby, as changes may be made in the form and method of construction, and equivalents may be substituted, without departing from the spirit and the scope of the invention, the form and method hereinbefore described being merely preferred embodiments thereof.

I claim:

1. The combination of a filament wound pressure vessel having an opening therein,
   a woven reinforcement structure of a size substantially smaller than said pressure vessel having a hole therein, said hole being substantially equal in size to the opening in the pressure vessel,
   fastening means for attaching said reinforcement structure to the rim area around the opening in the pressure vessel such that the opening and the hole are substantially in alignment,
   said reinforcement structure including at least one filament encircling the center of the woven reinforcement structure and interwoven with a plurality of second filaments emanating from the center of the woven reinforcement structure,
   adhesive means adapted to maintain the first filament and second filaments in a fixed relationship,
   whereby the stresses developed in the pressure vessel about the opening which tend to enlarge the size of the opening are primarily supported by the first filament.

2. A pressure vessel having an opening therein essentially consisting of:
   a plurality of layers of adhesively bonded filaments, a plurality of reinforcements of a size substantially smaller than said layers pre-placed about said opening and between said layers,
   said reinforcements consisting of a woven structure having a hole therein,
   said woven structure including a plurality of filaments extending in a radial fashion from the center of the woven structure and interwoven with at least one filament which extends circumferentially about the center of the woven structure,
   each of said loops lying in a single plane,
   whereby said one filament serves as a primary load bearing member for tension forces generated in the pressure vessel about said opening tending to enlarge the size of the opening.

References Cited by the Examiner

UNITED STATES PATENTS

| | | |
|---|---|---|
| 1,122,081 | 12/1914 | De Laski. |
| 1,362,134 | 12/1920 | Paul _____ 139—386 X |
| 1,473,998 | 11/1923 | Mixsell _____ 156—224 X |
| 1,504,272 | 8/1924 | Schegel. |
| 2,401,997 | 6/1946 | Whitman _____ 161—109 |
| 2,718,583 | 9/1955 | Noland et al. |
| 2,744,043 | 5/1956 | Ramberg _____ 220—3 X |
| 2,748,047 | 5/1956 | Kuss _____ 161—112 |
| 2,838,435 | 6/1958 | Hewitt _____ 156—224 X |
| 2,954,817 | 10/1960 | Havemann _____ 156—169 |
| 2,956,916 | 10/1960 | Voss et al. _____ 156—224 X |
| 2,988,240 | 6/1961 | Hardesty _____ 220—3 |
| 2,991,210 | 7/1961 | Matkovich _____ 156—293 X |
| 2,998,030 | 8/1961 | Koppelman et al. ___ 139—387 |
| 3,005,256 | 10/1961 | Young. |
| 3,074,585 | 1/1963 | Koontz _____ 220—3 |
| 3,083,864 | 4/1963 | Young. |
| 3,100,171 | 8/1963 | Hardesty _____ 156—294 X |
| 3,112,234 | 11/1963 | Krupp _____ 242—2 X |

FOREIGN PATENTS 337,063 2/1936 Italy.

DONALD W. PARKER, *Primary Examiner.*

RUSSELL C. MADER, *Examiner.*

J. KEE CHI, *Assistant Examiner.*